United States Patent [19]
Yamanari

[11] Patent Number: 5,153,927
[45] Date of Patent: Oct. 6, 1992

[54] CHARACTER READING SYSTEM AND METHOD

[75] Inventor: Masaya Yamanari, Hamura, Japan

[73] Assignee: Kabushiki Kaisha Toshiba, Kawasaki, Japan

[21] Appl. No.: 472,227

[22] Filed: Jan. 30, 1990

[30] Foreign Application Priority Data

Feb. 2, 1989 [JP] Japan .................. 1-24551

[51] Int. Cl.$^5$ .............................. G06K 9/00
[52] U.S. Cl. ......................... 382/61; 382/48
[58] Field of Search ............ 382/61, 48, 56, 57, 382/61; 364/728.01, 200; 358/403, 453, 468

[56] References Cited

PUBLICATIONS

I.B.M. Technical Disclosure Bulletin, vol. 26, Feb. 1984 by S. G. Aden et al., pp. 4718-4719.
MS-DOS Programmers Handbook, 1985, pp. 213-247.
MS-DOS Programming Technique, 1986, pp. 295-332.
Microsoft C Compole Run Time Library Reference, 1986, pp. 290-293.

*Primary Examiner*—Leo H. Boudreau
*Attorney, Agent, or Firm*—Oblon, Spivak, McClelland, Maier & Neustadt

[57] ABSTRACT

In a character reading system, a user-specific read processing is prepared by a user as separate from a standard read processing program (OCR handler) prepared by a maker, and it is stored in advance as an object program (executable load module) in a user execution file. An FC sheet on which format control information used in executing read processing is written, is fetched through an OCR and is registered in a user FC source file. Further, an interface file is prepared to provide an interface between the standard read processing program and the user processing program. A standard processing section fetches a slip and checks individual fields in the slip one by one, and writes in the interface file which file it is presently checking and the result of the checking. When there comes a field having user processing designated, the standard processing section starts a user processing section. The user processing section executes an executable load module and performs specific user processing based on the information written in the interface file. After completion of the user processing, the processing result is written in the interface file and the standard processing is started again.

16 Claims, 7 Drawing Sheets

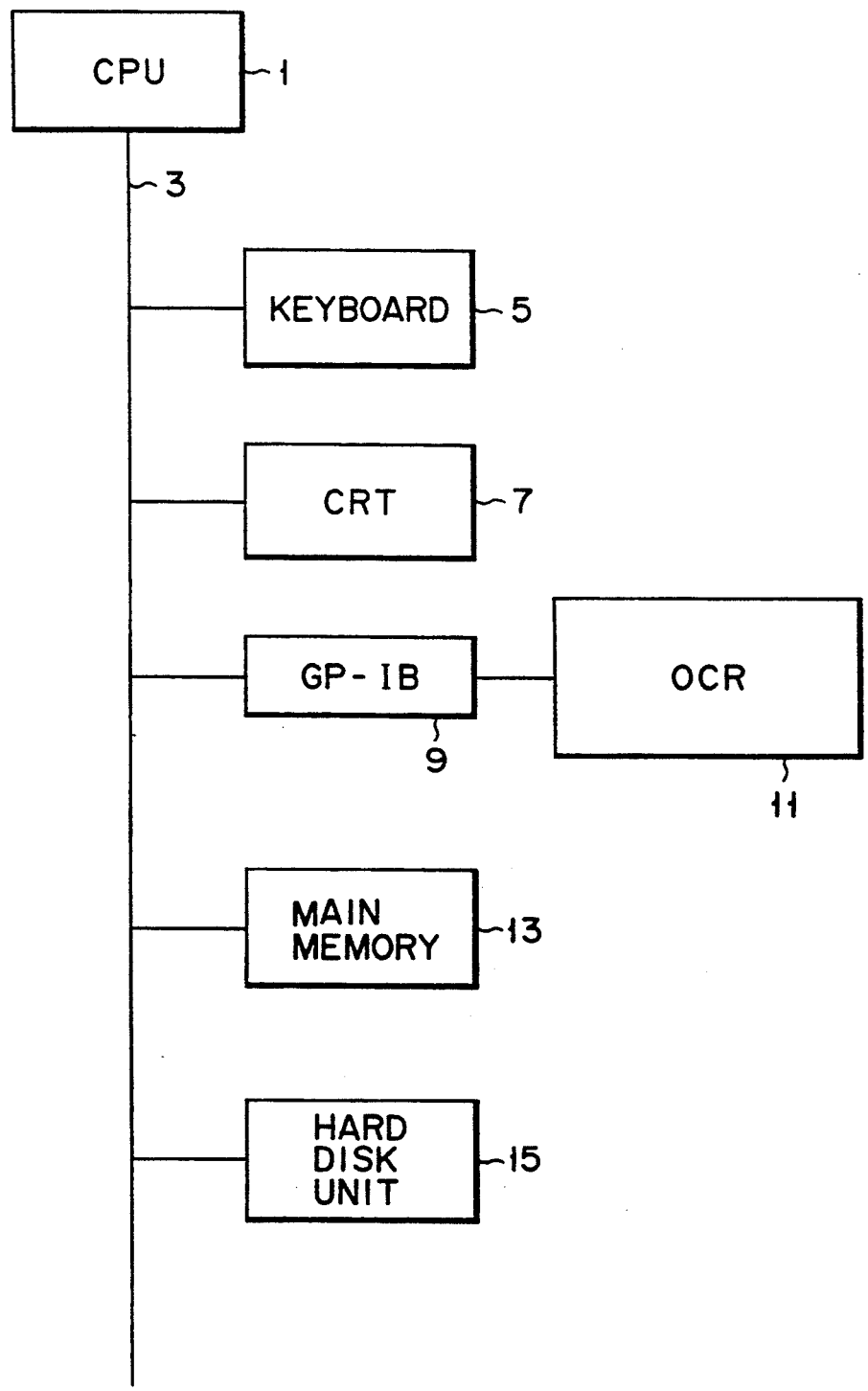
F I G. 1

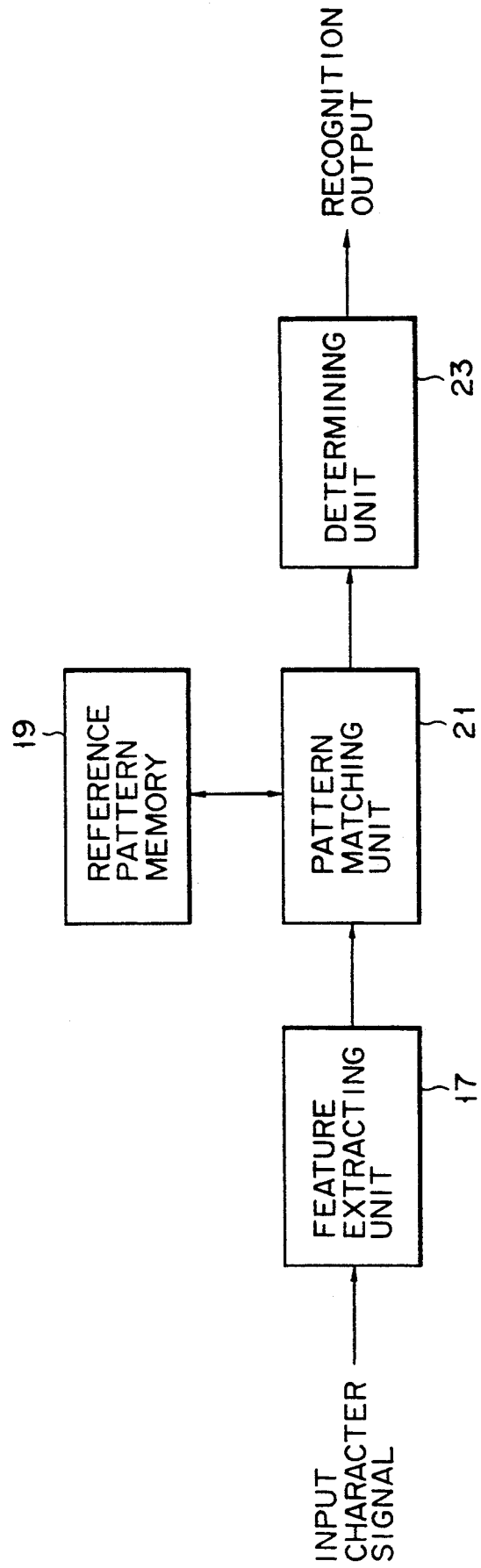
F I G. 2

CHARACTER READING SYSTEM AND METHOD

BACKGROUND OF THE INVENTION

1. Field of the Invention

The present invention relates to a character reading system which executes a process of reading characters filled in a form based on predetermined read control information.

2. Description of the Related Art

A character reading system, which reads characters in a form and performs character recognition processing, generally comprises a read processing section for executing read processing and a format control information (hereinafter called FC information) preparing section for setting read control information called FC information that is used when the read processing section executes the read processing. Normally, FC information is set in advance by an operator before execution of read processing. In performing read processing, the read processing section reads characters filled in a form based on preset FC information. FC information is produced as an optical character reader (OCR) scans FC information registering control sheet (hereinafter simply called control sheet) on which parameter information for preparing FC information has been written. Based on the parameter information read from the control sheet, an FC preparing program in the FC information preparing section prepares and registers the FC information.

A conventional character reading system is designed such that read processing is executed referring to pre-registered FC information in routines of a read processing program in the read processing section.

In a case where a user-specific process such as checking only a specific field in a form, or checking is done using a user-specific checking method, however, conventionally, a maker asks a user such particular specifications and re-writes the form processing program to include the requested processing functions. This conventional method requires that both the FC information preparing program and read processing program be altered, irrespective of the amount of changes made in the specifications. To change the mentioned programs on the user side, the user should know all the specifications of the form processing program written by the maker. This is practically difficult to do as makers do not generally show all the specifications to users. If a user somehow finds out the necessary specifications and modifies the aforementioned two programs, there is a problem of deciding who, the maker or the user, is responsible for a trouble when such occurs.

If the specifications are altered on the maker side, however, it is impractical to modify the programs every time according to the user-specific processes as such a job is time-consuming and requires human labors.

SUMMARY OF THE INVENTION

Accordingly, it is an object of this invention to provide a character reading system which can permit a user to easily prepare a user-specific processing program without the need for a maker to show all the specifications of its processing program to the user.

To achieve this object, according to the present invention, there is provided a character reading system for executing a process of reading characters written in a form based on preset read control information, which comprises:

individual processing means for executing individual processing designed for a specific purpose to be a target for alteration when contents of the read processing needs to be changed;

standard processing means for executing standard processing irrespective of alteration of contents of the read processing;

read control information setting means for setting the read control information for each of the individual processing means and the standard processing means; and process control means for, in a specific stage of standard processing executed by the standard processing means, starting the individual processing means, and re-starting the standard processing means after the started individual processing means completes individual processing.

According to this invention, a user processing section which permits a user to arbitrarily set a field the user personally wants to check in read processing for each field of a slip, and its checking method, is provided as separate from a standard processing section which performs the checking according to a predetermined algorithm when there is no user processing specified. Further, there is an interface section to interface between the standard processing section and the user processing section. The standard processing section checks individual fields in a slip one by one. Before checking each field, the standard processing section refers to flag information stored in the standard FC table to check if there is a designation of user processing in a field to be checked. If user processing is specified, the standard processing section notifies the interface section of control information that is necessary for the user processing section to check the field. As a result, the interface section starts the user processing section. The user processing section executes user-specific processing while referring to the interface file, writes the processing result into the interface file upon completion of the processing, and notifies the standard processing section of this event via the interface section. Consequently, the standard processing section checks subsequent fields again in accordance with a predetermined algorithm.

BRIEF DESCRIPTION OF THE DRAWINGS

Other objects and features of the present invention will be readily apparent from the following description taken in connection with the accompanying drawings in which:

FIG. 1 is a hardware block diagram illustrating one embodiment of an OCR system of the present invention;

FIG. 2 is a functional block diagram of an OCR 11 shown in FIG. 1;

DETAILED DESCRIPTION OF THE PREFERRED EMBODIMENTS

Figure 3:
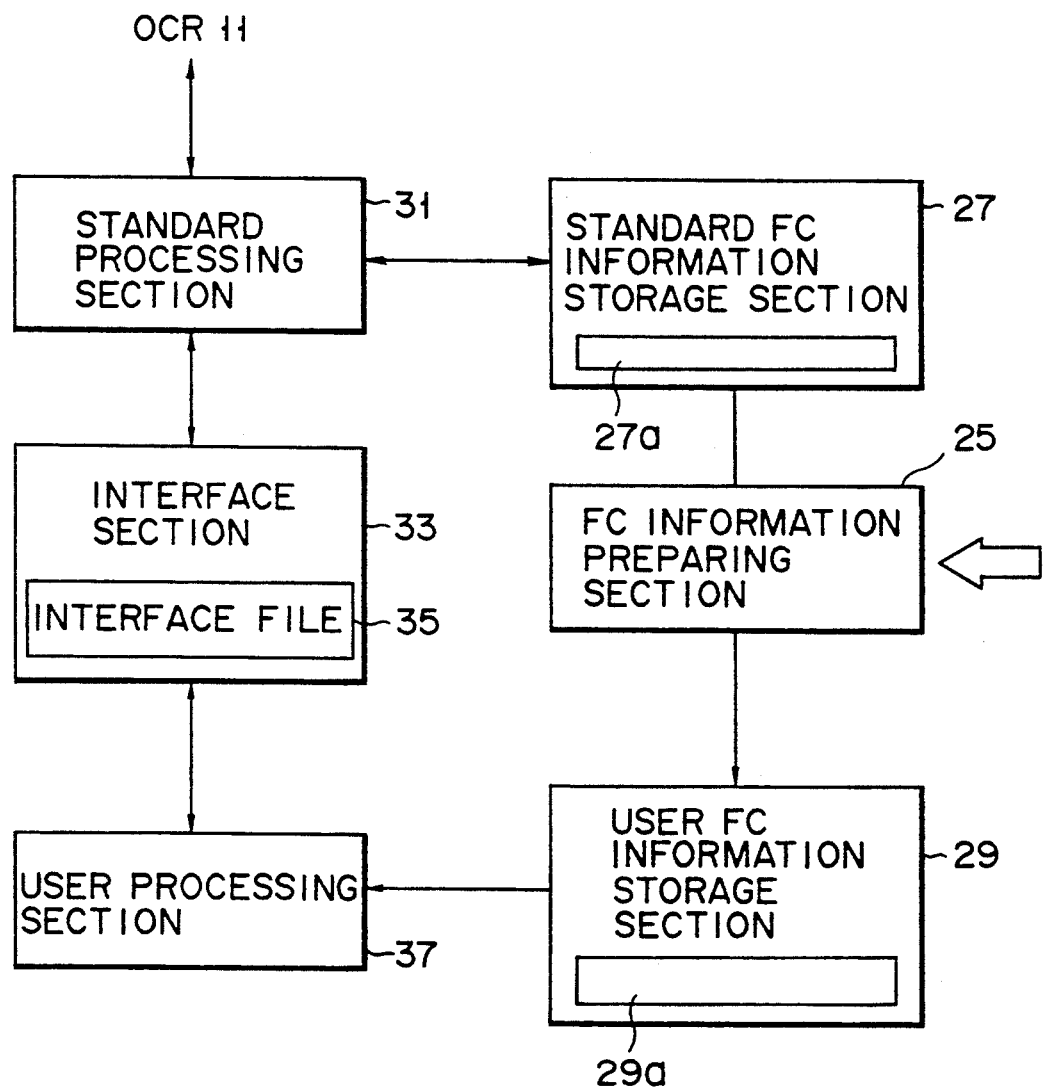
FIG. 3 is a functional block diagram of the OCR system of this invention.

FIG. 1 is a general system block diagram of an OCR system as the character reading system of the present invention. Referring to FIG. 1, a central processing unit (CPU) 1 performs the general control of the system. A keyboard 5 serves to input various types of data. A CRT display unit 7 displays various types of data. An OCR 11 is coupled via a general purpose interface board (GP-IB) 9 to the CPU 1, and scans data in a form or the like. A main memory (RAM) 13 stores input data, data to be displayed on the display unit 7, or file data or flag information, or the like. A hard disk unit 15 stores an OCR processing program, an execution file for standard processing of a form, an FC source file for a user, a user execution file, etc. The keyboard 5, display unit 7, OCR 11, main memory 13 and hard disk unit 15 are coupled via a system bus to the CPU 1.

As shown in FIG. 2, the OCR 11 causes a feature extracting unit 17 to extract a feature pattern from an input character signal. Then, a pattern matching unit 21 compares the extracted feature pattern to a reference pattern read out from a reference pattern, and outputs the result to a determining unit 23. The determining unit 23 in turn recognizes characters based on the comparison result from the unit 21 and outputs the recognition result.

FIG. 3 is a conceptual diagram of processing performed by the present OCR system.

The processing is generally classified into FC information registering and slip reading. The former processing is executed as follows. Prior to executing the slip reading, a user should prepare an FC sheet and a program for executing user-specific processing. There are two types of FC sheets, a standard processing FC sheet and a user processing FC sheet, both of which should be prepared by the user. As an FC sheet normally contains plural types of FC information, a plurality of FC sheets for standard processing are thus prepared. To identify these FC sheets, each FC sheet is provided with an ID (Identification Data) number field.

Each FC sheet is set on and scanned by the OCR 11. FC information output from the OCR 11 is sent to an FC information preparing section 25 to identify its ID number. If the received information is FC sheet information for standard processing, it is stored in a standard FC table 27a in a standard FC information storage section 27. The table 27a contains flag information representing, for example, where in a slip to read, data being alphabets or numerals, how many digits data consists of, data being handwritten or typed, or in which field in the slip user-specific processing is specified, as well as output format information. The table 27a is provided in association with an each ID number given on the slip. Note that this ID number is a number for discriminating one batch slip from another and is not related to the aforementioned ID number given in an FC sheet.

If the FC information from the OCR 11 is that for user processing, the FC information preparing section 25 likewise stores it in a user FC table 29a in a user FC information storage section 29.

Pre-processing for the slip reading is thus completed.

The slip reading is then executed. Bills are set on and scanned one by one by the OCR 11. Since each slip is provided with its own ID number as mentioned above, a standard processing section 31 executes a read processing based on FC information stored in that FC table which is associated with the ID number on the slip. In this embodiment, it is premised that such read processing is executed for each field in a slip.

The standard processing section 31 always refers to a standard FC table before reading each field to determine if user-specific processing is specified in that field by referring to the aforementioned flag.

If user-specific processing is specified, the standard processing section 31 starts an interface section 33. The interface section 33 prepares an interface file 35 and stores in this file the result of previous field processing performed by the standard processing section 31. Then, the interface section 33 starts a user processing section 37.

The user processing section 37 performs user-specific processing for a field to be subjected to processing, writes the processing result into the interface file, and starts the standard processing section 31 again. The standard processing section 31 then checks subsequent fields again.

Figure 4:
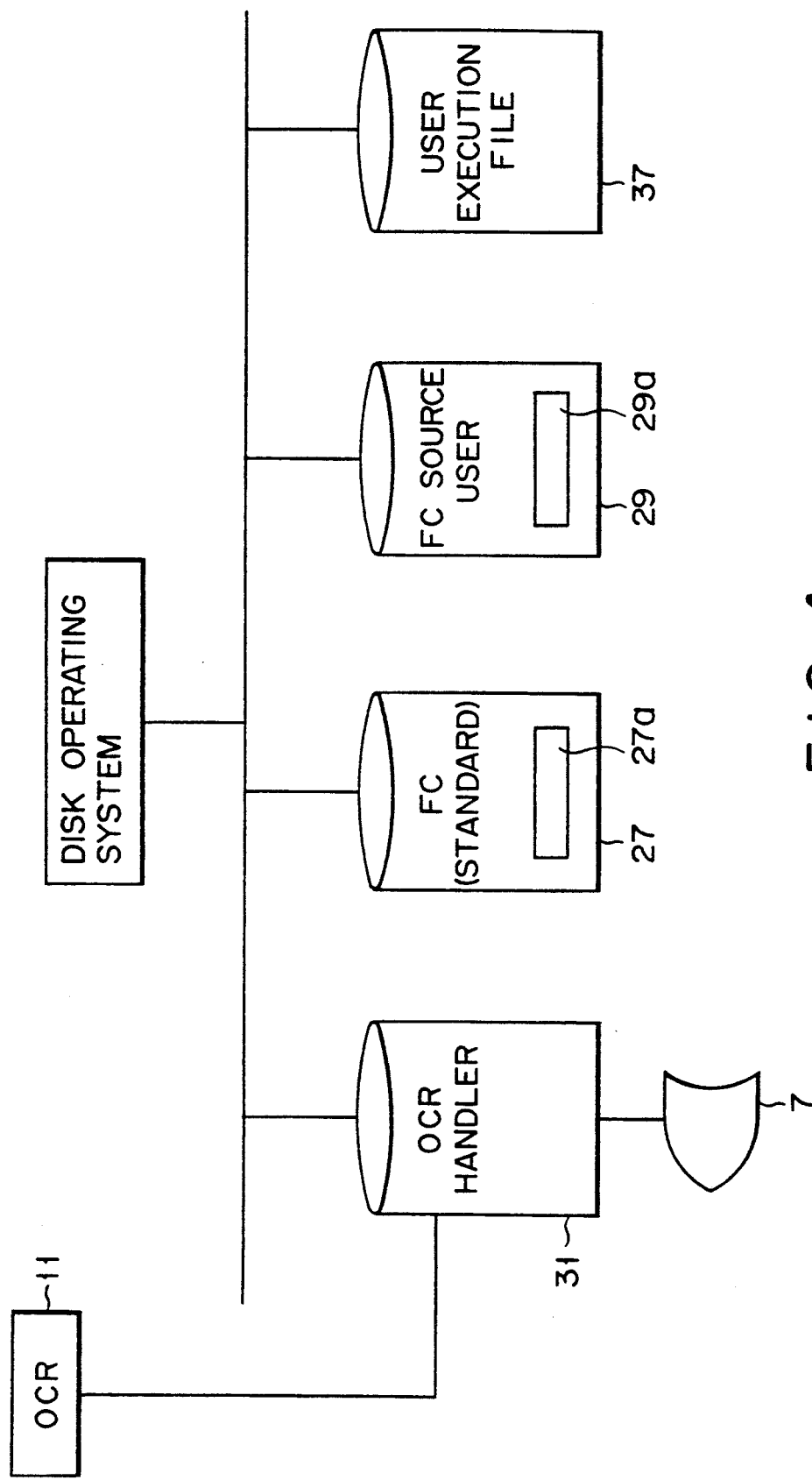
FIG. 4 is a functional block diagram of the OCR system of this invention as viewed from software side.

FIG. 4 is a conceptual diagram of the OCR system as viewed from a software side. This OCR system operates under the control of a Disk Operating System. An OCR handler 31, which corresponds to the standard processing section shown in FIG. 3, performs read processing, check processing, output processing, etc., based on the recognition result from the OCR 11. A standard FC file 27 corresponds to the standard FC information storage section 27 shown in FIG. 3. This file 27 may be provided in the hard disk unit 15 shown in FIG. 1 and stores control information for various processes, such as read processing, checking and output formatting, which are executed on the OCR side. A user FC source file 29 corresponds to the user FC information storage section 29 shown in FIG. 3 and stores control information for user-specific processing. A user execution file 37 corresponds to the user processing section 37 shown in FIG. 3, and stores, in the form of an executable load module, an object program obtained by compiling a source program which is coded by a user using a program language, such as C or BASIC. A user original program prepared specifically by the user can be placed in an arbitrary address space, and need not be linked to the standard processing program (i.e., basic OCR processing program (OCR handler) prepared by a maker). As the user stores a user-specific execution file in the hard disk unit 15, its user file name is stored in the directory. There are four user file namers in this embodiment, namely, "FIELD.EXE," "FORM.EXE," "FORMEDIT.EXE" and "BATCH.EXE." The starting of the user processing section 37 by the interface section 33 and returning again to the standard processing section 31 from the user processing section 37 as described earlier with reference to FIG. 3 can be performed by specifying the associated command if the library functions supported by the Disk Operating System are used. In this case, if a main memory address is affixed as a parameter to such a command, it can permit data which should be written in the interface file to be written into a predetermined area in the main memory 13 (FIG. 1) without preparing the interface file. This can therefore eliminate the interface file.

Figure 5:
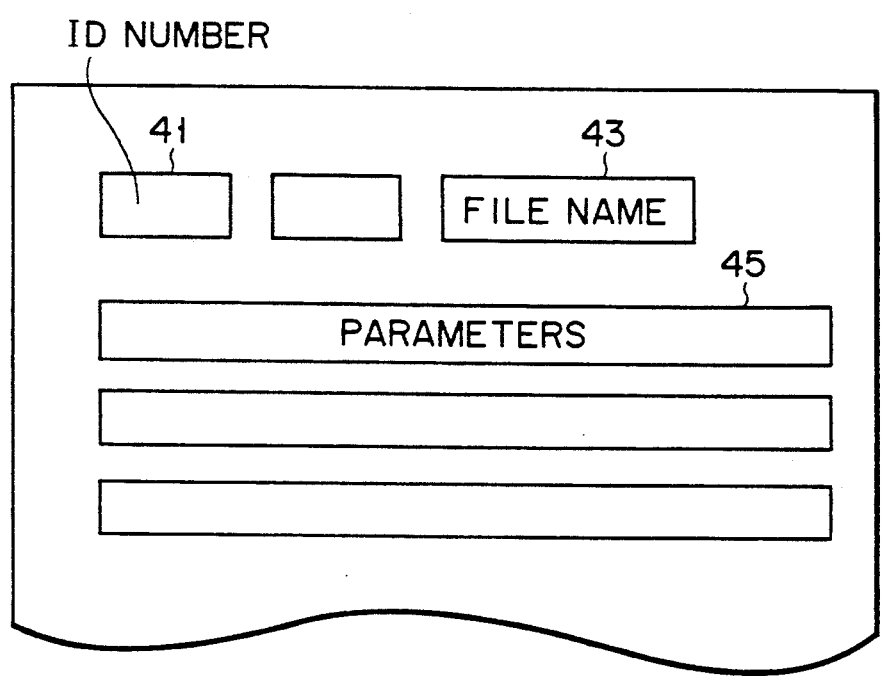
FIG. 5 is a diagram illustrating one example of an FC sheet.

FIG. 5 shows an example of the FC sheet. As illustrated in this diagram, the FC sheet is information necessary to store in advance in the standard FC file 27 or user FC source file 29 in the hard disk unit 15 information representing what processing (checking) is to be performed on which field in a form to be processed. The FC sheet consists of an ID number field 41, a file name field 43 and a parameter field 45. The ID number field 41 specifies whether the FC sheet is either a standard processing FC sheet or a user processing FC sheet. The file name field 43 is a field in which a standard processing program name or a user processing program name is written. The user processing program may be field execution file (FIELD.EXE) for performing a check for each field, a form execution file (FORM.EXE) for performing a check for each form, a form edit file (FORMEDIT.EXE) for executing edition of a form or a batch execution file (BATCH.EXE) for executing a batch process. Written in the parameter field 45 are information specifying, for example, which field in a slip is to be read, data being alphabets or numerals, how many digits data consists of, data being handwritten or typed, and on which field in the slip the user-specific processing should be executed, as well as output format information.

Figure 6:
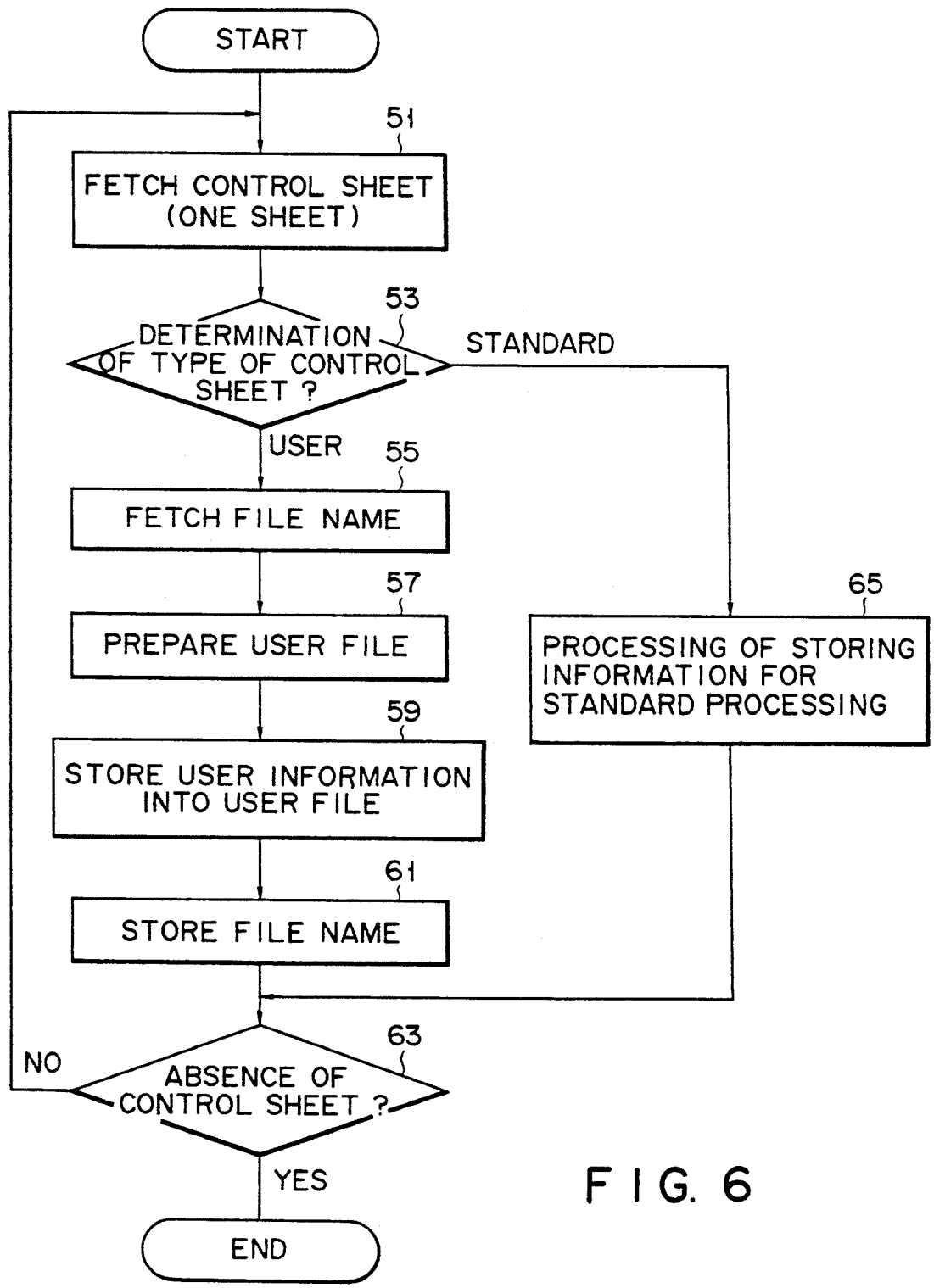
FIG. 6 is a flowchart illustrating registration processing of an FC sheet.

FIG. 6 is a flowchart illustrating how to register an FC sheet.

In the present instance, a plurality of FC sheets are read in advance through the OCR 11 and are stored as format control information into the user FC source file 29 or standard FC file 27 in the hard disk unit 15. In actual processing of a slip, an operator inputs an ID number through the keyboard to select which format control information to use.

It is assumed here that a user processing program has already been stored in the form of an executable load module in the user execution file 37.

In step 51, the CPU 1 fetches data on the first one of a plurality of FC sheets set on the OCR 11 by operating it. In step 53, the CPU 1 determines if the fetched FC sheet is for standard processing or for user processing from the read ID number. If the CPU 1 determines the FC sheet to be for standard processing, it prepares FC information for standard processing from the parameter field shown in FIG. 5 and stores the FC information in the standard FC table 27a in the standard FC file 27 shown in FIG. 4 in step 65. If the CPU 1 determines the FC sheet to be for user processing in step 53, it fetches a file name from the file name field 43 shown in FIG. 5 in step 55. The CPU 1 then prepares in step 57 the user FC source file 29 in the hard disk unit 15 to store user processing FC information. In the subsequent step 59, the CPU 1 prepares user processing FC information based on parameter information written in the parameter field 45 shown in FIG. 5, and stores it in the user FC table 29a in the user FC source file 29. In step 61, the CPU 1 registers the fie name in a predetermined directory provided in the user processing section file 37.

In step 63, the CPU 1 determines if registering of all the control sheets is completed. If the registration is not completed, the CPU 1 again executes the sequential processing from step 51 to step 63.

The registering of parameter information as shown in FIG. 6 is a process done prior to actual processing of a slip.

Figure 7:
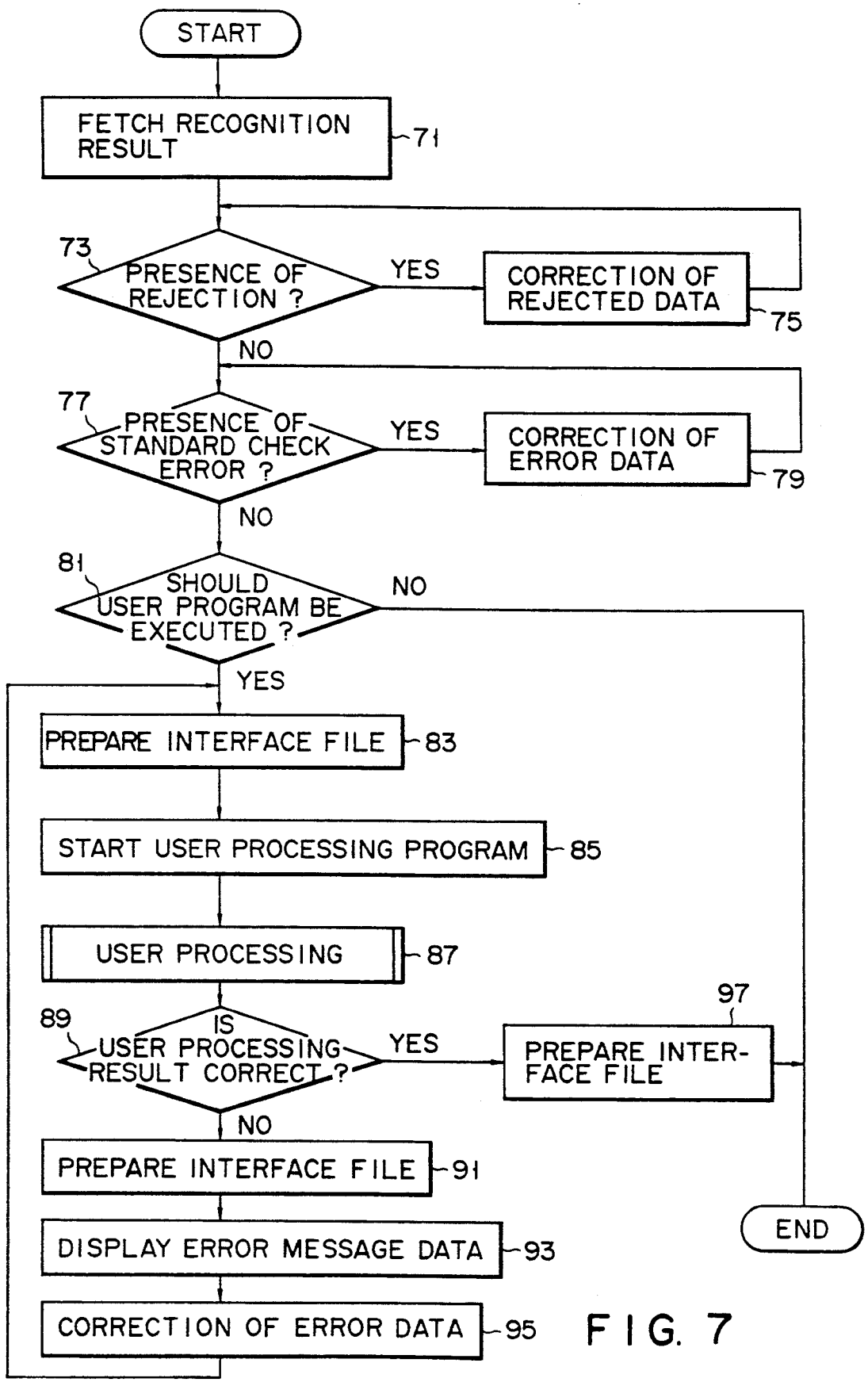
FIG. 7 is a flowchart illustrating the operation in a standard processing section.

Actual slip processing will now be described referring to the flowchart shown in FIG. 7.

It is assumed that a job to be executed is selected, a read mode is designated and other necessary operations are performed before starting the read processing. The job selection may be done by displaying a job menu on the CRT 7 and permitting an operator to select which ID number to use through the keyboard 5, for example. More specifically, entering the ID number written in the ID field 41 of the FC sheet can select FC information for standard processing or user processing. When the standard processing is specified, standard processing FC information associated with the entered ID number is read out from the standard processing FC file 27 and is loaded into, for example, the main memory 13. If user processing is specified, user processing FC information associated with the ID number is fetched into the main memory 13 from the user FC source file 29.

It is also assumed that a real-time correction mode is specified as a read mode. In other words, when there occurs rejection, a logical error or the like, a request can be made for correction at that time. More specifically, the standard processing section (OCR handler) 31 performs checking for each field in a slip and writes the checking result in the interface file 35 shown in FIG. 3, whereas when a field to be specifically checked appears, the user processing section 37 fetches the associated executable load module from the user execution file and executes it to perform the specific user processing.

It is further assumed that a slip ID number irrelevant to the number of a FC sheet is affixed to each slip and it corresponds to the aforementioned FC table.

The standard processing section 31 gives a command to the OCR 11 to scan one slip. In step 71, the CPU 1 receives the recognition result from the OCR 11. Then, an FC table corresponding to the slip ID number of the slip which has just been read is fetched from the standard FC table 27a. In the subsequent step 73, the standard processing section 31 determines whether or not there exists a rejected character in the slip. If there is a rejected character, the standard processing section 31 displays a rejected character pattern as well as a correction request message on the CRT 7 in step 75. This message may be stored in advance in the interface file 35. In response to this request, the operator enters the correct character via the FC table. When the rejected character is corrected, the standard processing section 31 executes a standard check (e.g., logical error check) on the aforementioned recognition result. If it is determined in step 77 that a standard check error exists, the standard processing section 31 displays a standard check error message on the CRT 7 and urges the operator to correct it.

In step 81, it is determined from the file name whether or not a user processing program should be started. The standard processing section 31 makes the decision actually by referring to the flag information in the FC table every time before checking each field in the slip to check if user-specific processing is designated in the field to be checked next. If no user processing program needs to be started, the standard processing section 31 performs the next processing.

If it is determined that a user processing program is to be started, the interface section 33 sets various types of field information necessary to execute the intended user processing, such as information to specify the field to be processed in the standard processing section 31 and information to specify a file in which the recognition result with respect to the field specified by the former information is to be stored. Further, the interface section 33 sets in the interface file 35 the name of the file (FIELD.EXE, FORM.EXE, FORMEDIT.EXE, BATCH.EXE) in which the parameter information necessary for user processing is registered. In the subsequent step 85, the interface section 33 starts the user processing section 37. This is done by fetching from the user execution file 37 the executable load module corresponding to the file name set in the interface file 35, loading it in a free area in the main memory, and then notifying the CPU 1 of the start address being as an execution start address. Actually, the user processing section 37 can be started by using commands of the library function supported by the Disk Operating System. As a result, in step 87, the user processing section 37 receives control information stored in the interface file 35, accesses the user FC source file 29 based on the file name stored in the interface file 35 to fetch the necessary parameter information for the user-specific processing (e.g., a specific check against a specific field) from the user FC table 29a and execute the processing. After completing the user processing, the user processing section 37 sets the correct/error status of the processing result as return status information in a specific register (not shown). The interface section 33 fetches the contents of the register and determines if the user-processing result is proper in step 89. If these results indicate an error, the interface section 33 prepares control information necessary to correct the error data into the interface file 35. Information set in the interface file 35 may be the name of the file containing error data, an error message for requesting correction of the error data, information representing designation of error data to be displayed and information specifying key protect processing upon correcting the error data. The key protect processing is a process wherein, for example, when an error occurs due to a numeral being filled in the target field for processing in which characters or alphabets should exist, those keys available for error correction are designated to be alphabet keys. When the interface file 35 for error data correction is produced, the interface section 33 starts the standard processing section 31. The error data correction is executed on the basis of the contents of the interface file 35. In step 93, the standard processing section 31 displays on the CRT 7 recognition result data which has been determined as error data and an error message set in the interface file 35 to request a user to correct the error data. When the user enters the correct data through the keyboard 5 based on the displayed error data and message, the standard processing section 31 corrects the corresponding data in the file where the recognized data is stored in step 95. The user processing is again performed on the recognition result data of a single target field which has undergone the correction.

If it is determined that the result of the user processing is correct in step 89, the interface section 33 produces in step 97 the interface file 35 which is referred to when the next standard processing is executed in the standard processing section 31. The interface section 3 then starts the standard processing section 31 which in turn executes the next processing.

The present invention is in no way restricted to the above particular embodiment. For instance, the foregoing description of the embodiment has been given with reference to a case where user processing to be executed in the user processing section 37 is to check if the result of recognition of characters written in one field indicates the proper character type (e.g., alphabet-only field, numeral-only field, etc.). However, it is possible not only to arbitrarily set the contents of user processing by a user, but also to arbitrarily set the stage at which the standard processing is changed to the user processing. For instance, another possible user processing may be a process for checking each form to undergo OCR processing, or user-specific processing such as editing the result of character reading for each field or each form and providing a display in a user-specified mode. Further, since parameter information described in an FC sheet is set in the user FC information storage section 29 according to the user processing set in the user processing section 37, processing the parameter information can also be arbitrarily set by user processing performed by the user processing section 37.

Although the above embodiment is designed to have the interface file 35 to write interface information between the standard processing section and the user processing section, a modification may be made so that such information can be written into a predetermined area in the main memory 13.

Additional advantages and modifications will readily occur to those skilled in the art. Therefore, the invention in its broader aspects is not limited to the specific details, representative devices, and illustrated examples shown and described. Accordingly, departures may be made from such details without departing from the spirit or scope of the general inventive concept as defined by the appended claims and their equivalents.

What is claimed is:

1. A characters reading system for executing a process of reading characters written in a form based on preset read control information, said system comprising:
   standard-process designating means for designating a standard process of a predetermined process for the character reading;
   first file means for storing a program for performing the standard process;
   user-process designating means for designating a user process of an optional process different from the standard process;
   second file means for storing a program for performing the user process; and
   control means for executing the standard-process program in accordance with the standard process designated by said standard-process designating means and for executing the user-process program in accordance with the user process designated by said user-process designating means if the user process is designated.

2. The system according to claim 1, further comprising:
   interface file means for interfacing the first file means and the second file means to mutually provide the results of the standard process and the user process.

3. The system according to claim 1, wherein the control means includes a central processing unit and a main memory, and the standard-process program includes means for writing the standard-process results into the main memory and means for informing the user-process program of an address of the location in the main memory of the process results.

4. The system according to claim 1, wherein the control means includes a central processing unit and a main memory, and the user-process program includes means for writing the user-process results into the main memory and means for informing the standard-process program of an address of the location in the main memory of the user-process results.

5. The system according to claim 1, wherein the control means includes means for arbitrarily setting a stage at which the standard process is changed to a user process.

6. The system according to claim 1, wherein the optional process includes a check process and an edit process.

7. The system according to claim 1, wherein the check process and the edit process are performed for each field or each form.

8. The system according to claim 1, wherein the control means includes a central processing unit and a main memory and the user-process program stored in the second file means is loaded in an arbitrary address space of the main memory.

9. A method for executing a process of reading characters written in a form based on preset read control information, said method comprising the steps of:
   a) designating a standard process of a predetermined process for the character reading;
   b) designating a user process of an optional process different from the standard process; and
   c) executing a standard-process program stored in a first file and for performing the standard process in accordance with the standard process designated by the designating step and for executing the user process program in accordance with the user process designated by the user process designating step if the user process is designated.

10. The method according to claim 9, further comprising a step of interfacing the first file and the second file to mutually provide the results of the standard process and the user process.

11. The method according to claim 9, wherein the step c) includes a step of writing the standard-process results into a main memory and for informing the user-process program of an address of the location in the main memory of the process results.

12. The method according to claim 9, wherein the step c) includes a step of writing the user process results into a main memory and informing the standard-process program of an address of the location in the main memory of the user-process results.

13. The method according to claim 9, wherein the step c) includes a step of arbitrarily setting a stage at which the standard process is changed to a user process.

14. The method according to claim 9, wherein the optional process includes a check process and an edit process.

15. The method according to claim 14, wherein the check process and the edit process are performed for each field or each form.

16. The method according to claim 9, wherein the user process program is loaded in an arbitrary address space of a main memory.

* * * * *